United States Patent [19]

Landesman

[11] Patent Number: 5,155,606
[45] Date of Patent: Oct. 13, 1992

[54] GLINT SUPPRESSION TECHNIQUE

[75] Inventor: Barbara T. Landesman, Placitas, N. Mex.

[73] Assignee: Lockheed Missiles & Space Company, Inc., Sunnyvale, Calif.

[21] Appl. No.: 802,916

[22] Filed: Dec. 6, 1991

[51] Int. Cl.$^5$ .................. G02B 27/46; G03H 1/16; G06K 9/74
[52] U.S. Cl. .................. 359/29; 359/559; 359/561; 359/563; 364/822; 382/31
[58] Field of Search .................. 359/29, 560, 561, 562, 359/563, 564, 559; 364/807, 822; 382/31

[56] References Cited

U.S. PATENT DOCUMENTS

| | | | |
|---|---|---|---|
| 3,085,469 | 4/1963 | Carlson | 359/559 |
| 3,977,771 | 8/1976 | Horner | 359/559 |
| 4,647,154 | 3/1987 | Birnbach et al. | 359/559 |
| 4,674,824 | 6/1987 | Goodman et al. | 359/559 |
| 4,906,069 | 3/1990 | Brandstetter et al. | 359/559 |
| 4,976,520 | 12/1990 | Brandstetter et al. | 359/559 |
| 5,080,464 | 1/1992 | Toyoda | 359/559 |
| 5,111,515 | 5/1992 | Javidi | 359/559 |

Primary Examiner—Bruce Y. Arnold
Assistant Examiner—Martin Lerner
Attorney, Agent, or Firm—John J. Morrissey

[57] ABSTRACT

Glints (e.g., images of point sources attributable to specular reflections) are suppressed in the focal plane of an optical imaging system by:

a) Fourier-transforming an image of the imaging system's object field (including glints), and dividing the resulting energy distribution into a first channel and a second channel;

b) focussing the energy in the first channel onto a first diffraction grating so as to impose a periodic carrier on the image, thereby producing a first image signal;

c) directing the energy in the second channel so as to illuminate a Fourier-transform hologram of the complex point response of the imaging system to which additional aberrations (preferably toroidal aberrations) have been added;

d) focussing the energy distribution from the hologram onto a second diffraction grating that is 180° out-of-phase with the first diffraction grating, and blocking higher diffracted orders, thereby producing a second image signal;

e) superimposing the first and second image signals (which are 180° out-of-phase with each other) by means of a beamsplitter to produce a difference signal in a pupil plane;

f) stopping down the final pupil of the imaging system to prevent transmission of energy attributable to the glints; and g) focussing the final pupil of the imaging system to a final image in which glints have been suppressed.

13 Claims, 4 Drawing Sheets

FIG_1

SPATIAL DOMAIN

FIG_2

FREQUENCY DOMAIN

FIG_4

FIG_5

FIG_6

GLINT SUPPRESSION TECHNIQUE

TECHNICAL FIELD

This invention pertains generally to optical imaging, and more particularly to a technique for suppressing glints (i.e., images of point sources) that occur in the focal plane of an optical imaging system due to specular reflections from surfaces in the object field of the system.

BACKGROUND OF THE INVENTION

When a scene in the object field of an optical imaging system is imaged onto a focal plane, specular reflections (i.e., light from a natural source such as the sun, or from a man-made source such as an illuminating laser, that is reflected from surfaces within the object field of the system) can appear as glints in the focal plane.

A "specular reflection" occurs when an incident electromagnetic wave is reflected from a surface in the object field of the optical imaging system in a definite direction so that the directions of the incident and reflected waves make equal angles with (and lie in the same plane as) a line perpendicular to the reflecting surface. Glints are defined as bright images of unresolved objects that occur randomly in the focal plane of the optical imaging system. Specular reflections usually emanate from regions of the object field that are unresolved by the optical imaging system, and normally appear as point sources (i.e., Airy disk patterns) in the focal plane of the system.

In the case of an active optical tracking system, a high-energy laser (HEL) beam is used to illuminate a target (e.g., a hostile missile). Specular reflections of the HEL beam from the target can appear as glints in the focal plane of the tracking system. Regions of the object field of the tracking system that are unresolved by the system could include, e.g., integral portions of a target that is being tracked, background clutter, and debris resulting from countermeasures against the actively-tracked target.

Reflections of an HEL beam from an actively-tracked target typically radiate in relatively small solid angles. Thus, glints occurring in the focal plane of an active optical tracking system are likely to contain relatively large energy fluxes. A large number of such glints can produce a total energy flux sufficient to mask the image of the target in the focal plane, or at least to fuzz the image of the target in the focal plane to a significant extent. In general, glints in the focal plane tend to impede imaging. In an active optical tracking system, glints can hinder accurate pointing of the HEL beam toward a selected target during crucial phases of the target's trajectory.

The problem of optically distinguishing a diffuse object in the presence of very bright sources of optical noise has been encountered in the prior art in connection with, e.g., image-forming and image-processing systems. In an article by P. F. Mueller and H. J. Caulfield entitled "Photographic Dynamic Range Suppression", *Applied Optics*, Vol. 19, (1980), pages 4134–4135, a technique called "dynamic range compression" (also called "unsharp masking") for eliminating glare in photographs is discussed, (where "glare" is defined as a very bright extended region of reflection).

Other optical image processing techniques that have been used in the prior art for detecting objects in a variety of applications (e.g., earth resource studies, meteorology, automatic surveillance and/or inspection, pattern recognition, and bandwidth compression) include matched filtering; correlation processing; edge detection; image subtraction; and inverse filtering using various kinds of holographic elements, pupil plane masks and gratings in coherent or incoherent systems. However, the optical detection of an object in the presence of very bright point-source images in the focal plane presents some unusual difficulties that have not heretofore been addressed in the design of real-time imaging and image-processing systems.

A major difficulty in optically detecting an object such as an actively tracked target involves the determination of glint positions in the focal plane of the tracking system. In the somewhat related discipline of optical pattern recognition and detection, target positions in the focal plane can be determined by techniques such as matched filtering, or optical correlation, or image subtraction. However, matched filtering and optical correlation techniques are extremely sensitive to parameters such as rotation, size, shape and orientation of the target, and hence are of only limited usefulness in tracking targets (e.g., hostile missiles) that cannot be completely characterized a priori with respect to such parameters.

Image subtraction techniques, on the other hand, are relatively insensitive to the rotation, size, shape and orientation of a target, and hence in principle could be used in determining glint positions in target tracking applications. A helpful discussion of image subtraction techniques is found in an article by J. F. Ebersole entitled "Optical Image Subtraction", *Optical Engineering*, Vol. 14, (1975), pages 436–447. However, until the present invention, no practicable method had been developed for implementing an image subtraction technique for use in determining glint positions (or otherwise suppressing glints) in the focal plane of an optical imaging system.

SUMMARY OF THE INVENTION

It is a general object of the present invention to provide a technique for suppressing glints in the focal plane of an optical imaging system.

It is a more particular object of the present invention to provide an optical subtraction technique for determining glint positions in the focal plane of an optical imaging system, and for subtracting such glints so as to provide an unambiguous image of an object in the focal plane.

In a particular embodiment of the present invention, the combined image of a target and its associated glints formed in the focal plane of an optical target tracking system can be represented by a waveform function $t(x,y)$, where x and y are spatial coordinates. The waveform function $t(x,y)$ represents an energy distribution in the spatial domain that is characteristic of the image of the target and its associated glints, and therefore is designated hereinafter as the waveform of the "original" image. In accordance with the present invention, glints appearing in the "original" image are suppressed by first producing a Fourier transform $T(\xi,\eta)$ of the "original" image waveform, where $\xi$ and $\eta$ are frequency coordinates.

In the notation used hereinafter, according to the convention described by J. D. Gaskill in *Linear Systems, Fourier Transforms, and Optics*, (John Wiley and Sons, 1978), a function written in lower case such as $t(x,y)$ represents a complex field in the spatial domain (i.e., in the focal plane), and a function written in upper case such as $T(\xi,\eta)$ represents the Fourier transform of the corresponding lower case function $t(x,y)$. Variables of the lower case function are written in Roman letters such as x and y, which represent spatial coordinates in units of length. Variables of the upper case function are written in Greek letters such as $\xi$ and $\eta$, which represent spatial frequency coordinates in units of inverse length. Thus, the upper case function $T(\xi,\eta)$ represents the energy distribution in the frequency domain (i.e., in the pupil plane) corresponding to the complex field in the focal plane as represented by the lower case function $t(x,y)$.

The energy in the Fourier-transformed waveform of the "original" image is then split into two substantially identical portions for propagation in two correspondingly different channels. The energy introduced into each of the two channels has a waveform function $T_1(\xi,\eta)$, which represents an energy distribution in the frequency domain. In the first channel, the energy is propagated with a substantially unchanged waveform function $T_1(\xi,\eta)$, which is simply the Fourier transform of the waveform of the "original" image containing glints.

In the second channel, a Fourier-transform hologram is positioned to intercept the energy propagated therein. The Fourier-transform hologram functions as a recording of the Fourier transform of the complex point response (i.e., the pupil function) of the optical imaging system to which some aberrations have been added. The energy introduced into the second channel, after being transmitted by the Fourier-transform hologram, assumes a waveform function $T_2(\xi,\eta)$, which is characterized as the Fourier transform of the waveform of a so-called "replicated" image. The "replicated" image is a slightly aberrated version of the "original" image containing glints.

Each of the waveform functions $T_1(\xi,\eta)$ and $T_2(\xi,\eta)$ is then retransformed to the spatial domain by a diffraction grating located in the focal plane of each channel. The diffraction gratings in the two channels are $\pi$ out-of-phase with each other. The spatial-domain waveform functions thereby produced by the diffraction gratings are then transformed back to the frequency domain as waveform functions $T_1'(\xi,\eta)$ and $T_2'(\xi,\eta)$, which are superimposed upon each other to form a difference signal $$T_1'(\xi,\eta) - T_2'(\xi,\eta).$$

This difference signal $T_1'(\xi,\eta) - T_2'(\xi,\eta)$ is transformed one last time to the spatial domain (viz., to the so-called "final" image plane) in which glints are suppressed.

Calculation of the difference signal $T_1'(\xi,\eta) - T_2'(\xi,\eta)$ in the frequency domain (i.e., in the pupil plane) is designated herein as "optical pupil subtraction", which is contrasted with "optical image subtraction" that is conventionally performed in the spatial domain (i.e., in the focal plane). Optical pupil subtraction is a distinguishing feature of the present invention.

Optical subtraction in the pupil plane (i.e., optical pupil subtraction) is significantly more effective than optical subtraction in the focal plane (i.e., optical image subtraction) for suppressing glints, because there is a drastic difference in terms of spatial frequency content between a glint and the image of a target. In general with respect to linear invariant optical systems, as discussed by J. W. Goodman in *Introduction to Fourier Optics* (McGraw Hill, 1968), a glint (i.e., the image of a point source of optical radiation) in the focal plane of a diffraction-limited optical system contains all of the spatial frequencies that are passed by the aperture of the optical system. A point source by definition has zero physical extent, and therefore consists of an infinite continuum of spatial frequencies (because the Fourier transform of a delta function is a constant). Since the aperture of the optical system is necessarily finite in extent, the aperture can pass only those spatial frequencies that are consistent with the size and shape of the aperture. Thus, the spatial frequency content of a glint consists of a continuum of frequencies of constant amplitude bounded by the aperture edge.

By contrast, the object being imaged by the optical system (i.e., the target in the case of a target tracking system) has a finite size and shape. Thus, the image of the target formed in the focal plane has a corresponding finite spatial frequency content. Ordinarily, the spatial frequencies of the object being imaged (i.e., the target) are all passed by the aperture of the optical system with little attenuation. Consequently, the spatial frequency content of the image of the target consists of the Fourier transform of the target, which is generally an intricate energy distribution in which the spatial frequencies are of varying amplitudes.

At the pupil plane of a target tracking system, a glint has a spatial frequency signature (i.e., an energy distribution pattern represented by a "top hat" or cylinder function) that is substantially the same as the spatial frequency signature of the optical system. However, the spatial frequency signature of a target at the pupil plane consists primarily of spatial frequencies that are consistent with the size and shape of the target. Thus, the spatial frequency signature of the target is unique for the particular target, and is very different from the spatial frequency signature of the aperture of the target tracking system. When a specific set of aberrations is added to a Fourier-transformed "original" glint (i.e., the "original" pupil) to produce a Fourier-transformed "replicated" glint (i.e., the "replicated" pupil), the resulting differences in the frequency domain between the "original" pupil and the "replicated" pupil occur primarily at the edge of the so-called "final" pupil, where the "final" target signature in the frequency domain is formed. These differences in the frequency domain can be substantially eliminated by spatially filtering (i.e., "stopping down") the "final" pupil.

By contrast, the differences between the "original" glint and the "replicated" glint at the focal plane (i.e., the "final" image plane in the spatial domain) occur primarily with respect to characteristics such as the height, shape and width of the main lobe and the height, shape and spacing of the side lobes of spatial signatures. Such characteristics are hard to "match up" prior to a subtraction in the spatial domain; and consequently, a residual image (i.e., what is left over after the subtraction process) is difficult to eliminate. Thus, glint subtraction is easier to achieve in the frequency domain (i.e., at the pupil plane) than in the spatial domain (i.e., at the focal plane).

BEST MODE OF CARRYING OUT THE INVENTION

The technique for suppressing glints in the focal plane of an optical imaging system according to the present invention is described herein with respect to a particular embodiment, viz., a target tracking system. For purposes of illustration, it is stipulated that a barely-resolved and randomly-oriented target image occurs among a number (typically a large number) of images of randomly-positioned and possibly moving point sources (i.e., glints) in the focal plane of the target tracking system. Each glint appears in the focal plane as an Airy disk, whose total power can be as much as 1000 times greater than the power in the target image. However, the total power in either a glint or the target image is assumed to be quite small, i.e., in the order of picowatts to microwatts. It is further stipulated that the target tracking system described herein must be capable of detecting the target in real time.

In conventional optical image subtraction, a periodic carrier waveform is superimposed upon two waveforms represented by functions $T_1(\xi,\eta)$ and $T_2(\xi,\eta)$ in the frequency domain, which are the Fourier transforms of two corresponding functions $t_1(x,y)$ and $t_2(x,y)$ in the spatial domain representing input scenes. The energy distribution $T(\xi,\eta)$ resulting from the image subtraction process is given by $$T(\xi,\eta) = T_2(\xi,\eta)[1 + \cos(2\pi u_0\xi)] + T_1(\xi,\eta)[1 - \cos(2\pi u_0\xi)] \quad (1)$$
$$= T_2(\xi,\eta) + T_1(\xi,\eta) + [T_2(\xi,\eta) - T_1(\xi,\eta)]\cos(2\pi u_0\xi).$$

The inverse Fourier transform $t(x,y)$ of the energy distribution $T(\xi,\eta)$ represents the subtracted image of the scenes $t_1(x,y)$ and $t_2(x,y)$ in the spatial domain, and is given by the expression $$t(x,y) = t_2(x,y) + t_1(x,y) + \quad (2)$$
$$[t_2(x,y) - t_1(x,y)] \oplus\oplus \tfrac{1}{2}[\delta(x - u_0) + (x + u_0)],$$

where $\delta(x \pm u_0)$ are delta functions centered at $x = \pm u_0$, and where the symbol $\oplus\oplus$ represents two-dimensional convolution. A useful review of the mathematics involved in equation (2) can be found in *Linear Systems, Fourier Transforms, and Optics* by J. D. Gaskill, (Wiley and Sons, 1978).

As seen from equation (2), the subtracted image $t(x,y)$ consists of three components, viz., (1) the sum of the two input scenes centered on the optic axis of the target tracking system; (2) the difference of the two input scenes centered about an off-axis point corresponding to the carrier frequency, i.e., the point $x = u_0$; and (3) the difference signal repeated about the off-axis point $x = -u_0$. In conventional optical image subtraction, the subtracted image $t(x,y)$ is then spatially filtered to eliminate the sum $t_2(x,y) + t_1(x,y)$, thereby leaving only the difference $t_2(x,y) - t_1(x,y)$.

The technique of the present invention differs from conventional optical image subtraction in that, according to the present invention, optical subtraction is performed at the pupil plane in the frequency domain (i.e., the domain of the Fourier transforms of the target image and the glints) rather than at the focal plane in the spatial domain (i.e., the domain of the spatial dimensions of the target image and the glints). The rationale for performing pupil subtraction in the frequency domain rather than image subtraction in the spatial domain is grounded upon the recognition that there is a greater difference in information content between the input scenes $t_1(x,y)$ and $t_2(x,y)$ in the frequency domain than in the spatial domain.

Figure 1:
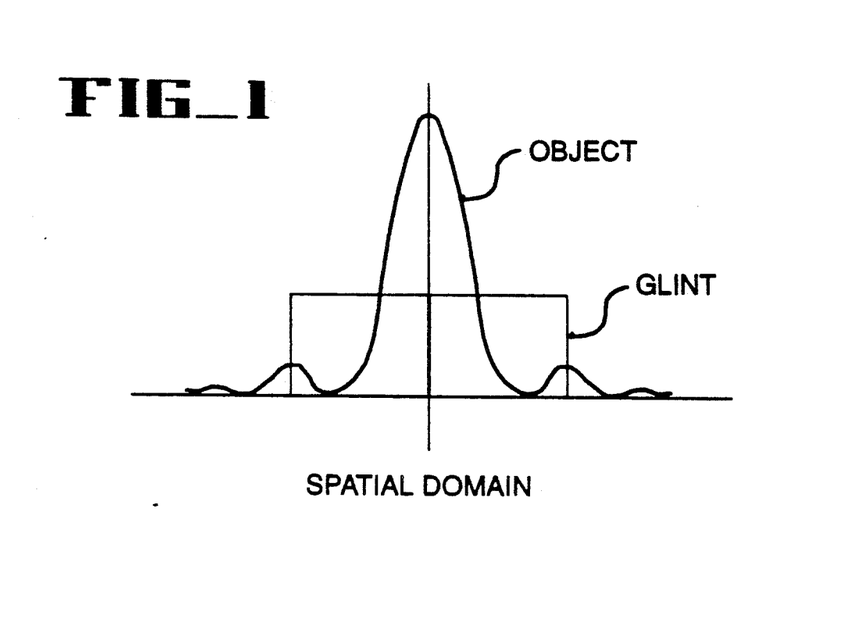
FIG. 1 shows superimposed graphical representations of intensity as a function of a specified spatial dimension (e.g., cross-sectional diameter) for the image of an object having a specified configuration, and for a glint associated with that object, which are formed on the focal plane of an optical imaging system.

In FIG. 1, superimposed graphical representations are shown of intensity as a function of a designated spatial dimension (e.g., a cross-sectional width) for the image of an object having a specified configuration, and for a typical glint, which are formed simultaneously on the focal plane of an optical imaging system (e.g., an optical tracking system in which the target is illuminated by an HEL beam). For purposes of illustration, the object (i.e., the target) is assumed to be configured so that the image of the target is rectangular in the focal plane (i.e., so that the graphical representation of the target image appears as a "top hat" function in the spatial domain as shown in FIG. 1). The glint appears as an Airy disk in the focal plane, so that the graphical representation of the glint appears as a corresponding energy distribution function in the spatial domain as shown in FIG. 1.

Figure 2:
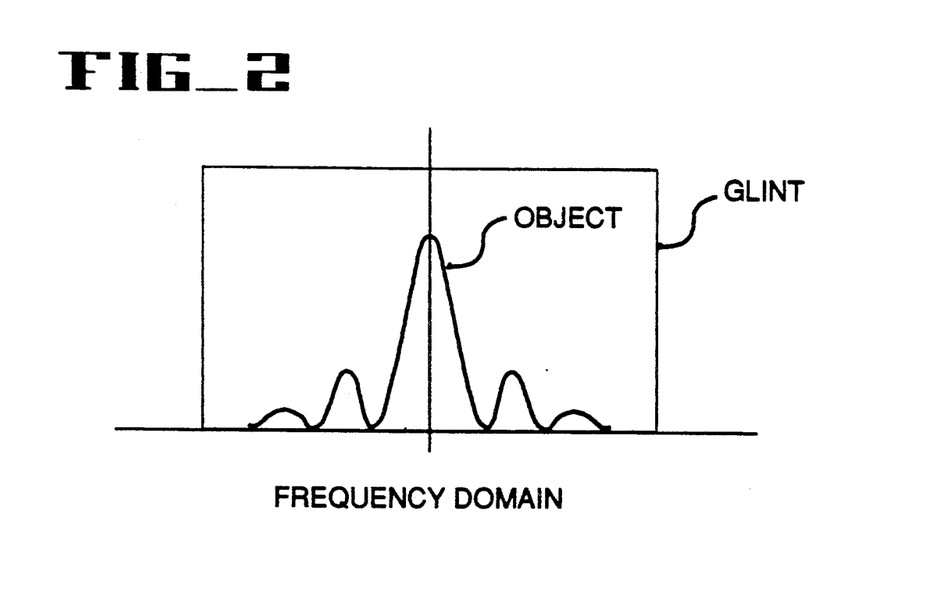
FIG. 2 shows superimposed graphical representations of intensity as a function of frequency for Fourier-transformed images of the object and glint of FIG. 1 on the Fourier-transformed focal plane (i.e., the pupil plane) of the optical imaging system of FIG. 1.

In FIG. 2, superimposed graphical representations are shown of intensity as a function of frequency for the Fourier-transformed target image and the Fourier-transformed glint of FIG. 1. Thus, the graphical representations shown in FIG. 2 represent the target image and the glint of FIG. 1 in the frequency domain, and can be considered as "signatures" of the target and the glint in the pupil plane. Since the glint contains all the frequencies passed by the aperture of the target tracking system, the graphical representation of the Fourier-transformed glint appears as a "top hat" function in the frequency domain as shown in FIG. 2. However, the graphical representation of the Fourier-transformed target image appears as an energy distribution function in the frequency domain as shown in FIG. 2.

The superimposed target image and glint in the spatial domain, as graphically illustrated in FIG. 1, can be considered as the "original" image formed on the focal plane. There would typically be a plural number (usually a large number) of glints in the "original" image; but for purposes of illustration, the "original" image can be considered herein as containing the target image plus a single glint. The superimposed target and glint signatures in the frequency domain, as illustrated in FIG. 2, can be considered as the Fourier-transformed "original" image.

In accordance with the present invention, energy from the Fourier-transformed "original" image is split into two portions for propagation in two corresponding channels. In one channel, the energy is propagated with a waveform $T_1(\xi,\eta)$ expressed in terms of coordinates $\xi$ and $\eta$ in the frequency domain. In the other channel, aberrations are added to the Fourier-transformed "original" image to produce a so-called Fourier-transformed "replicated" image, which is propagated with a waveform $T_2(\xi,\eta)$ likewise expressed in terms of the coordinates $\xi$ and $\eta$ in the frequency domain.

The aberrations added to the "original" image could in principle be a single aberration or a combination of aberrations of any kind, but are preferably a combination of higher-order toroidal aberrations. Toroidal aberrations are simply standard Seidel aberrations that exist only in a particular radial zone or zones.

The resemblance in the frequency domain between a glint in the Fourier-transformed "original" image and the same glint in the Fourier-transformed "replicated" image is closer in magnitude and shape than is the corresponding resemblance in the spatial domain between the glint in the "original" image and the same glint in the "replicated" image. Consequently, pupil subtraction in the frequency domain provides a more efficient subtraction technique than conventional image subtraction in the spatial domain for suppressing glints.

Figure 3:
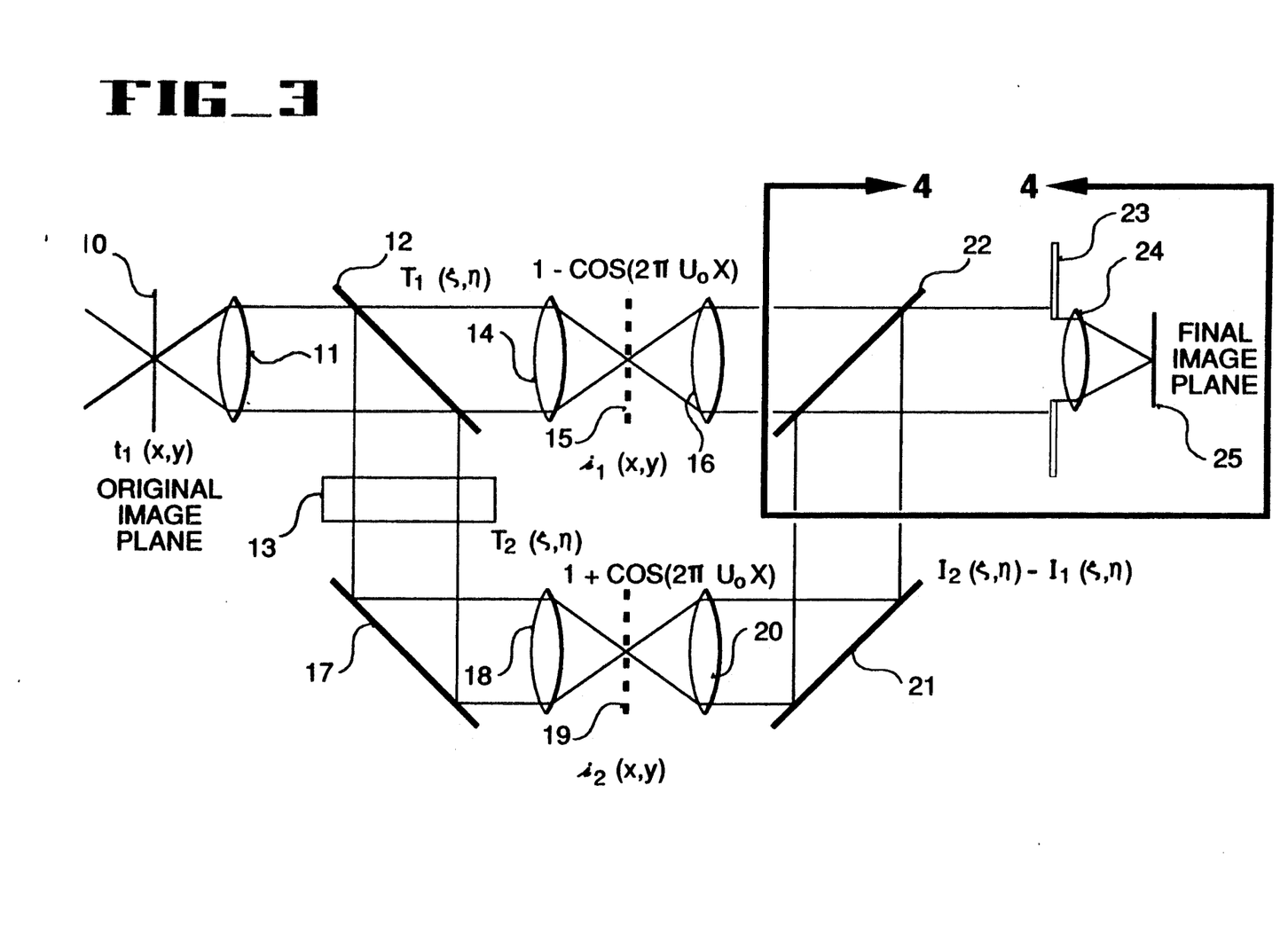
FIG. 3 is a schematic view of an apparatus according to the present invention for suppressing glints in the focal plane of an optical system.

An apparatus for performing optical pupil subtraction in accordance with the present invention is illustrated in FIG. 3 in which a focal plane 10 represents the focal plane of a conventional optical imaging system. The "original" image (i.e., the target image with its associated glints) is formed on the focal plane 10 by conventional optical means, and is represented mathematically by the waveform $t_1(x,y)$ expressed in terms of the spatial coordinates x and y. The focal plane 10 can be considered as the "original" image plane. A lens 11 images the waveform $t_1(x,y)$ at infinity, and thereby produces a Fourier transform $T_1(\xi,\eta)$ of the "original" image $t_1(x,y)$.

The waveform $T_1(\xi,\eta)$, which is the Fourier transform of the "original" image expressed in terms of the frequency coordinates $\xi$ and $\eta$, is then split by a beamsplitter 12 (which can be conventional) for propagation in two separate channels. In the first channel, the waveform $T_1(\xi,\eta)$ is propagated substantially unchanged. In the second channel, the Fourier-transformed "original" image having the waveform $T_1(\xi,\eta)$ is transmitted through a Fourier transform hologram 13, which introduces additional aberrations into the Fourier-transformed "original" image to produce a Fourier-transformed "replicated" image. The Fourier-transformed "replicated" image, which is a slightly aberrated version of the Fourier-transformed "original" image (i.e., a slightly aberrated version of the target image plus its associated glints) in the frequency domain, is propagated as the waveform $T_2(\xi,\eta)$.

In the first channel, the waveform $T_1(\xi,\eta)$ is focussed in a conventional manner by an appropriate means, which is represented in FIG. 3 by a lens 14, onto a diffraction grating 15, which causes the waveform $t_1(x,y)$ of the "original" image to be superimposed onto a periodic carrier wave of frequency $u_0$. The energy distribution $i_1$ of the waveform $t_1(x,y)$ on the grating 15, as expressed in the spatial coordinates x and y, is given by $$i_1(x,y) = t_1(x,y)[1 - \cos(2\pi u_0 x)]. \tag{3}$$

The energy distribution $i_1(x,y)$ is then Fourier-transformed to the waveform $I_1(\xi,\eta)$ by a Fourier transform device, which is represented in FIG. 3 by a lens 16, which focusses $i_1(x,y)$ at infinity. Because of the periodicity of the carrier frequency $u_0$, the grating 15 generates multiple diffracted orders (i.e., energy distributions that propagate at different angles with respect to the optic axis of the system). For the sake of simplicity, waveforms for the higher diffracted orders are not shown in FIG. 3. In practice, waveforms for the higher diffracted orders are separated, or are allowed to separate, in space from the first-order term before the energy distribution $i_1(x,y)$ is focussed by the lens 16 at infinity.

In the second channel, the Fourier transform hologram 13, which produces the waveform $T_2(\xi,\eta)$, could be a conventional film hologram, but is preferably a computer-generated hologram (CGH), which introduces computer-generated aberrations into the waveform $T_1(\xi,\eta)$. The waveform $T_2(\xi,\eta)$ can be "folded" by means of an appropriately positioned reflector 17 so that the second channel assumes a convenient disposition with respect to the first channel. Thus, for example, it might be convenient in terms of manufacturability and/or packageability of the apparatus for a portion of the second channel to extend parallel to the first channel as illustrated in FIG. 3.

The waveform $T_2(\xi,\eta)$, whether or not "folded" as illustrated in FIG. 3, is focussed in a conventional manner by an appropriate means represented in FIG. 3 as a lens 18 onto a diffraction grating 19, which causes the waveform $t_2(x,y)$ of the "replicated" image to be superimposed onto a periodic carrier wave of frequency $u_0$. The energy distribution $i_2$ of the waveform $t_2(x,y)$ on the grating 19, as expressed in the spatial coordinates x and y, is given by $$i_2(x,y) = t_2(x,y)[1 + \cos(2\pi u_0 x)]. \tag{4}$$

The energy distribution $i_2(x,y)$ is then Fourier-transformed to the waveform $I_2(\xi,\eta)$ by a Fourier transform device represented in FIG. 3 by a lens 20, which focusses $i_2(x,y)$ at infinity. Because of the periodicity of the carrier frequency $u_0$, the grating 19 likewise generates multiple diffracted orders. For the sake of simplicity, waveforms for the higher diffracted orders are not shown in FIG. 3.

The two waveforms $I_1(\xi,\eta)$ and $I_2(\xi,\eta)$ are then combined to produce a difference signal $T_2(\xi,\eta) - T_1(\xi,\eta)$, which is a signal in the frequency domain that serves as a "final" pupil, i.e., the Fourier transform of the "final" image. Combination of the waveforms $I_1(\xi,\eta)$ and $I_2(\xi,\eta)$ can be accomplished, as illustrated in FIG. 3, by "folding" the output of the Fourier transform device 20 by means of a reflector 21 to a beamsplitter 22, which is positioned in the path of the output of the Fourier transform device 16. The beamsplitter 22 transmits approximately half the energy in the output of the Fourier transform device 16 through an aperture stop 23 and a focussing lens 24 to a focal plane 25. The beamsplitter 22 also reflects approximately half the energy in the output of the Fourier transform device 20 (as reflected by the reflector 21) through the aperture stop 23 and the focussing lens 24 to the focal plane 25. Thus, the waveforms $I_1(\xi,\eta)$ and $I_2(\xi,\eta)$ are superimposed at the aperture stop 23, which defines the "final" pupil.

The focal plane 25 can be considered as the "final" image plane. The energy contributed by the waveform $I_1(\xi,\eta)$ to the "final" image formed on the focal plane 25 is substantially equal to the energy contributed by the waveform $I_2(\xi,\eta)$ to the "final" image. The resultant energy distribution $I(\xi,\eta)$ in the "final" pupil is given by $$I(\xi,\eta) = I_1(\xi,\eta) + I_2(\xi,\eta) \tag{5}$$

$$I(\xi,\eta) = T_1(\xi,\eta) \oplus \oplus \{\delta(\xi,\eta) - \tfrac{1}{2}[\delta(\xi - u_0) + \delta(\xi + u_0)]\delta(\eta)\} +$$

$$T_2(\xi,\eta) \oplus \oplus \{\delta(\xi,\eta) + \tfrac{1}{2}[\delta(\xi - u_0) + \delta(\xi + u_0)]\delta(\eta)\}.$$

Rearranging terms in equation (5) yields $$I(\xi,\eta) = [T_1(\xi,\eta) + T_2(\xi,\eta)] \oplus \oplus \delta(\xi,\eta) + \tag{6}$$

$$\tfrac{1}{2}[T_2(\xi,\eta) - T_1(\xi,\eta)] \oplus \oplus \delta(\xi + u_0)\delta(\eta) +$$

$$\tfrac{1}{2}[T_2(\xi,\eta) - T_1(\xi,\eta)] \oplus \oplus \delta(\xi - u_0)\delta(\eta).$$

Performing the two-dimensional convolution yields $$I(\xi,\eta) = [T_1(\xi,\eta) + T_2(\xi,\eta)] + \tfrac{1}{2}[T_2(\xi-u_0,\eta) - T_1(\xi - u_0,\eta)] + \tfrac{1}{2}[T_2(\xi+u_0,\eta) - T_1(\xi+u_0,\eta)]. \tag{7}$$

Thus, as is apparent from equation (7), the total Fourier transform $I(\xi,\eta)$ representing the spatial frequency content of the "final" image on the focal plane 25 has three parts, viz., a "sum" term and two "difference" terms. The "sum" term $T_1(\xi,\eta) + T_2(\xi,\eta)$ represents the combined energy contributions from the two channels in the frequency domain at an "on-axis" location in the focal plane 25. The "difference" terms represent the energy contributions from the two channels, respectively, in the frequency domain at locations on the focal plane 25 corresponding to the frequency values $\xi = \pm u_0$ for the diffraction gratings 15 and 19.

Figure 4:
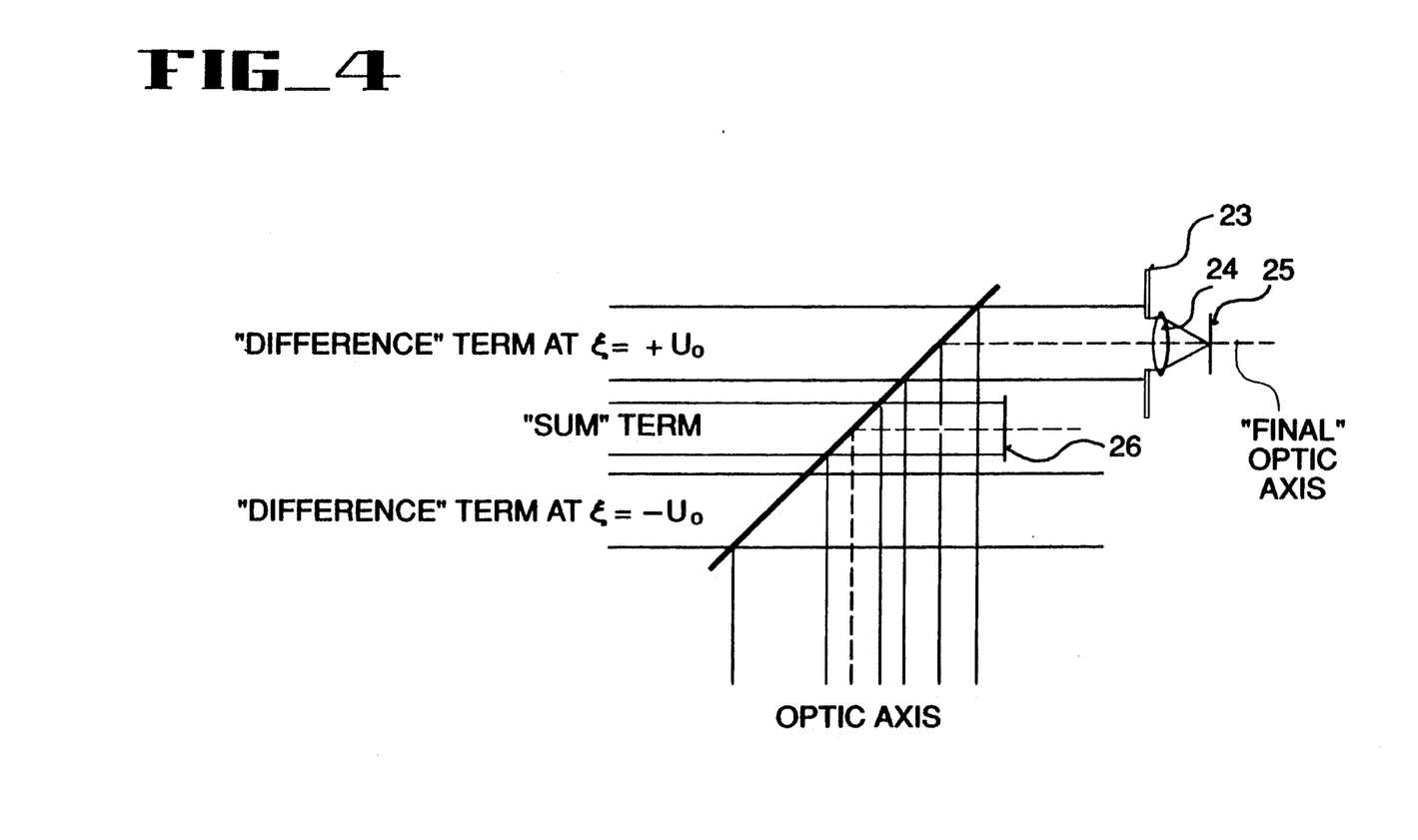
FIG. 4 is an expanded schematic view illustrating the aperture stop, focussing lens and "final" image plane of an apparatus according to the present invention as shown within line 4—4 of FIG. 3.

Only the last two terms in equation (7) have useful information content. The "sum" term $[T_1(\xi,\eta) + T_2(\xi,\eta)]$ in equation (7) constitutes an undesired background signal that, if focussed by the lens 24 onto the focal plane 25, would prevent detection of the information-bearing difference signal $[T_2(\xi,\eta) - T_1(\xi,\eta)]$. Therefore, the "sum" term (i.e., the background signal) must be prevented from reaching the focal plane 25. This can be accomplished by spatially filtering $I(\xi,\eta)$ in the "final" pupil plane (i.e., in the aperture stop 23), which is done by blocking the on-axis "sum" term $[T_1(\xi,\eta) + T_2(\xi,\eta)]$ The difference signal $[T_2(\xi,\eta) - T_1(\xi,\eta)]$, the signal of interest, resides at two independent locations simultaneously, viz., at $\xi = +u_0$ and $\xi = -u_0$. Either of the signal terms $T_1(\xi,\eta)$ and $T_2(\xi,\eta)$ can be focussed by the lens 24 so as to become the "on-axis" location in the focal plane 25. Preferably, the signal terms $T_1(\xi,\eta)$ and $T_2(\xi,\eta)$ are superimposed so that the difference signal $[T_2(\xi,\eta) - T_1(\xi,\eta)]$ at $\xi = +u_0$ and the difference signal $[T_2(\xi,\eta) - T_1(\xi,\eta)]$ at $\xi = -u_0$ are additively combined, thereby making most efficient use of all the available signal energy. The three terms in equation (7), i.e., the "sum" term and the two "difference" terms, represent three waveforms, all of which are propagated (in collimated space) parallel to the optic axis of the system. The "sum" term is centered about the optic axis, and must be spatially filtered (i.e., blocked) in the "final" pupil plane. Also, the two "difference" terms, after having been additively combined, must be arranged so as to be centered about the optic axis. In practice, centering of the "sum" and "difference" terms about the optic axis could be accomplished by use of additional beam-folding reflectors. Alternatively, just one of the "difference" terms can be chosen so that the location $\xi = +u_0$ or $\xi = -u_0$ becomes the "final" optic axis, in which case the aperture stop 23 and the focussing lens 24 are centered about this "final" optic axis as illustrated in FIG. 4.

In the case of a glint, each of the two "difference" terms in equation (7) has a zero value at the "on-axis" location (i.e., at the center of symmetry of the "difference" term, which occurs at the locations for which $\xi = \pm u_0$ in the pupil plane of the focussing lens 24), and has non-zero values at the "off-axis" locations (i.e., at the locations for which $\xi \neq \pm u_0$). Thus, contributions to the "final" image from a glint can be eliminated by closing down the aperture stop 23 (i.e., by "stopping down" the pupil) sufficiently so as to spatially filter out the contributions from the "difference" terms.

In general, a hologram can be regarded as a recording of an interference pattern between two wavefronts, which are usually referred to as an "object" wavefront and a "reference" wavefront. In the present case, the Fourier transform of the complex point response of the optical imaging system is considered as the "object" wave, and the Fourier transform of a plane wave propagating at an angle with respect to the optic axis of the optical imaging system is considered as the "reference" wave. Thus, the Fourier transform hologram 13 illustrated in FIG. 3 can be regarded as a recording of the interference pattern between the Fourier transform of the complex point response of the optical imaging system and a plane wave propagating at an angle with respect to the optic axis of the system.

Figure 5:
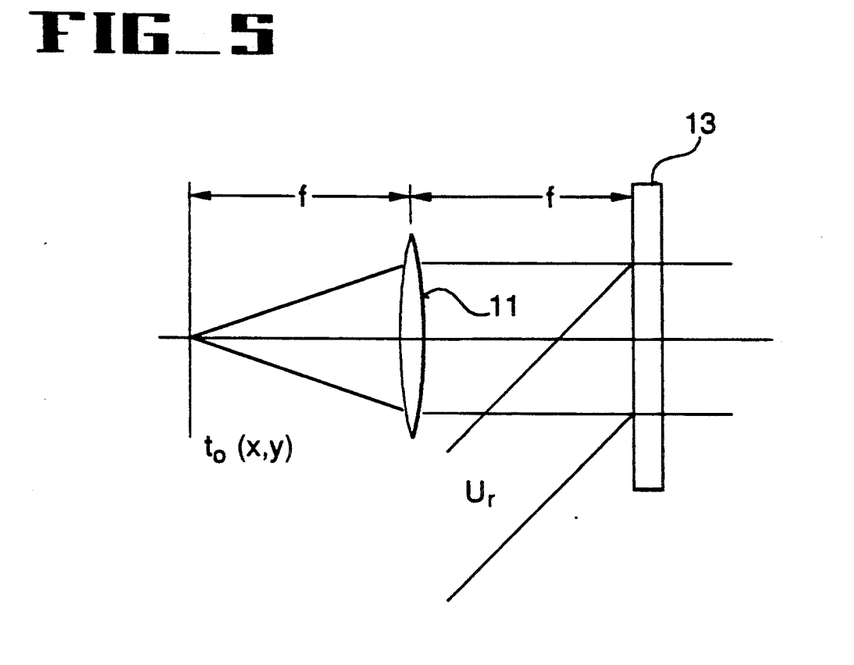
FIG. 5 is a graphical illustration of the recording process for a Fourier-transform hologram.

By illuminating a hologram with a beam having the waveform of one of the two wavefronts that comprise the hologram (i.e., one of the two "recorded" wavefronts), the other of the wavefronts that comprise the hologram can thereby be reconstructed. The transmission of a hologram is proportional to the intensity of the superposition of the two wavefronts (i.e., the "object" wavefront and the "reference" wavefront) comprising the hologram. Thus, a transmission function $t_{holo}(x,y)$ for a hologram can be expressed as $$\begin{aligned} t_{holo}(x,y) &= |U_0 + U_r|^2 \\ &= |U_0|^2 + |U_r|^2 + U_0^* U_r + U_0 U_r^* \end{aligned} \tag{8}$$

where $U_o$ represents the complex "object" wave function, and $U_r$ represents the "reference" wave function. If the hologram is illuminated with a replica of the "reference" wave function $U_r$, the resulting energy distribution behind the hologram (i.e., to the right of the hologram 13 as shown in FIG. 5) is given by the expression $$\begin{aligned} \Psi(\xi,\eta) &= t_{holo} U_r \\ &= U_r|U_o|^2 + U_r|U_r|^2 + U_0^* U_r^2 + U_r^* U_r U_0 \\ &= U_1 + U_2 + U_3 + U_4, \end{aligned} \tag{9}$$

where $U_1 = U_r|U_o|^2$; where $U_2 = U_r|U_r|^2$; where $U_3 = U_o^* U_r^2$; and where $U_4$ can be expressed as $$U_4 = |U_r|^2 U_o, \tag{10}$$

which is a replica of the complex "object" wavefront $U_o$ within a multiplicative constant.

FIG. 5 illustrates the process whereby a Fourier transform hologram (e.g., the hologram 13 of FIG. 3) records the complex point response $t_o(x,y)$ of an optical imaging system. When the hologram 13 is placed in the back focal plane of a lens (e.g., the lens 11 of FIG. 3), the "object" wavefront $U_o(x,y)$ impinging upon the hologram 13 is the Fourier transform of $t_o(x,y)$. The "object" wavefront $U_o(x,y)$ is defined as the pupil function of the optical imaging system.

The "object" wavefront $U_o(x,y)$, which forms one of the two constituent recorded wavefronts of the Fourier transform hologram 13, can be expressed as $$U_o(x,y) = cyl\left(\frac{\sqrt{x^2 + y^2}}{d}\right), \quad (11)$$

where d is the diameter of the pupil. For purposes of the present discussion, the pupil function is assumed to be aberration-free.

The "reference" wavefront $U_r(x,y)$ forming the other constituent recorded wavefront of the Fourier transform hologram 13 has a plane wave amplitude $A_r$, and travels at an angle with respect to the x-axis. The "reference" wavefront $U_r(x,y)$ can be expressed as $$U_r(x,y) = A_r e^{j2\pi\xi_0 x}. \quad (12)$$

The transmission function $t_{holo}(x,y)$ for the Fourier transform hologram 13 can therefore be expressed as $$\begin{aligned} t_{holo} &= |U_0 + U_r|^2 \\ &= cyl^2\left(\frac{\sqrt{x^2 + y^2}}{d}\right) + \\ &\quad A_r^2 + cyl\left(\frac{\sqrt{x^2 + y^2}}{d}\right)A_r e^{j2\pi\xi_0 x} + \\ &\quad cyl\left(\frac{\sqrt{x^2 + y^2}}{d}\right)A_r e^{-j2\pi\xi_0 x}. \end{aligned} \quad (11)$$

In the playback mode, the "object" wavefront is reconstructed by illuminating the Fourier transform hologram 13 with a replica of the "reference" wavefront used in the recording process. Thus, in the playback mode, the Fourier transform hologram 13 is illuminated with a collection of plane waves travelling in different directions, which represent a collection of glints in the Fourier-transformed "original" image. This collection of plane waves is treated as a single wave called the playback wave, which has a wavefront $U_p(x,y)$ that can be expressed as $$U_p(x,y) = \sum_n e^{j2\pi\xi_n x} e^{j2\pi\eta_n y}. \quad (14)$$

Figure 6:
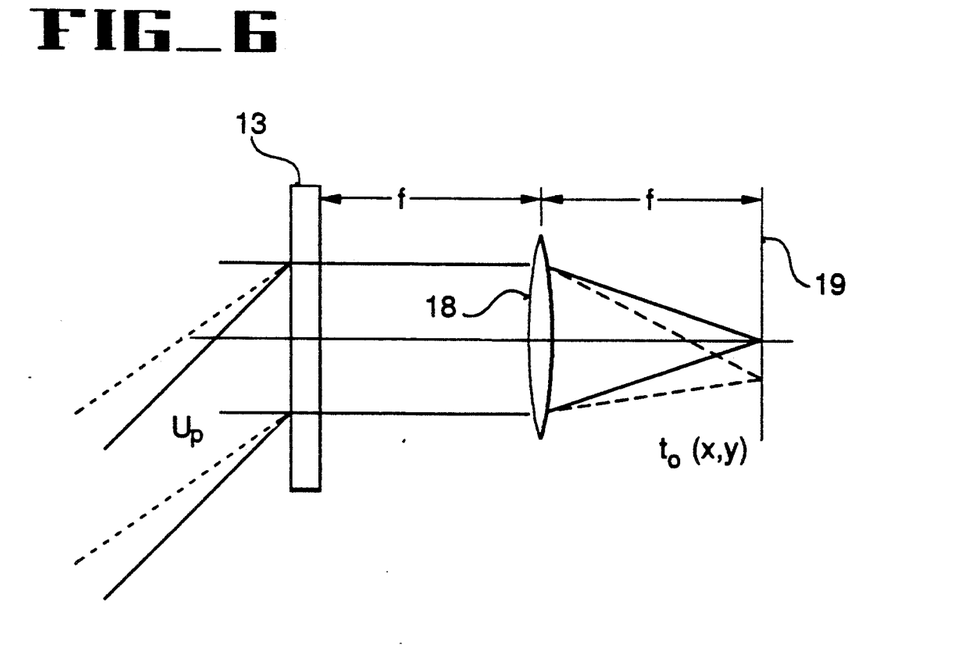
FIG. 6 is a graphical illustration of the playback process for a Fourier-transform hologram.

FIG. 6 illustrates the process whereby the Fourier transform hologram 13 is illuminated with the replica of the "reference" wavefront $U_r(x,y)$. This replica, i.e., the playback wave having the wavefront $U_p(x,y)$, can be incident upon the hologram 13 at the same angle as the wave used in recording the hologram (as indicated by solid lines to the left of the hologram 13 in FIG. 6), or at any other angle (as indicated by broken lines to the left of the hologram 13 in FIG. 6). The only requirement imposed upon the playback wave is that the wavefront $U_p(x,y)$ be planar.

As illustrated in FIG. 3, the hologram 13 is placed in the front focal plane of the Fourier transform lens 18, and a replica of the complex point response $t_o(x,y)$ of the optical imaging system appears in the back focal plane of the lens 18 (i.e., on the grating 19). If the playback wave illuminates the hologram 13 at the same angle as the wave used in recording the hologram, a real image of the complex point response $t_o(x,y)$ appears at the same location with respect to the optic axis that was occupied by the complex point response $t_o(x,y)$ during the recording process. If the playback wave illuminates the hologram 13 at some other angle with respect to the optic axis, the image of the complex point response $t_o(x,y)$ is shifted off-axis by a distance corresponding to the angular offset of the playback wave from the recorded wave.

The wavefront reconstructed from the hologram 13 is expressed in the spatial domain by a function $\psi(x,y)$, where $$\begin{aligned} \psi(x,y) &= t_{holo}(x,y)U_p(x,y) \quad (15) \\ &= \left[cyl^2\left(\frac{\sqrt{x^2 + y^2}}{d}\right) + A_r^2\right]\sum_n e^{j2\pi\xi_n x} e^{j2\pi\eta_n y} + \\ &\quad A_r cyl\left(\frac{\sqrt{x^2 + y^2}}{d}\right)\sum_n e^{j2\pi(\xi_n + \xi_0)x} e^{j2\pi\eta_n y} + \\ &\quad A_r cyl\left(\frac{\sqrt{x^2 + y^2}}{d}\right)\sum_n e^{j2\pi(\xi_n - \xi_0)x} e^{j2\pi\eta_n y}. \end{aligned}$$

The reconstructed wavefront $\psi(x,y)$ is inversely Fourier-transformed (as by the lens 18 in FIG. 3) to produce a wavefront $\Psi(\xi,\eta)$ in the frequency domain, where $$\begin{aligned} \Psi(\xi,\eta) &= \sum_n somb(d\sqrt{(\xi - \xi_n)^2 + (\eta - \eta_n)^2}) \quad (16) \\ &\quad \star\star\, somb(d\sqrt{(\xi - \xi_n)^2 + (\eta - \eta_n)^2}) + \\ &\quad \sum_n A_r^2 \delta(\xi - \xi_n, \eta - \eta_n) + \\ &\quad A_r \sum_n somb(d\sqrt{(\xi - \xi_n - \xi_0)^2 + (\eta - \eta_n)^2}) + \\ &\quad A_r \sum_n somb(d\sqrt{(\xi - \xi_n + \xi_0)^2 + (\eta - \eta_n)^2}), \end{aligned}$$

where the symbol ☆☆ denotes autocorrelation. The somb function in equation (16) represents the complex point response of the optical imaging system; and the squared magnitude of the somb function, i.e., $|somb|^2$, represents the point spread function of the system, as discussed in the aforementioned text *Linear Systems, Fourier Transforms, and Optics* by J. D. Gaskill.

The first two terms on the right-hand side of equation (16) represent an energy blur centered about the optic axis in the back focal plane of the Fourier transform lens 18. These energy-blur terms are of no interest in target-tracking applications, and are filtered out. The last two terms on the right-hand side of equation (16) represent arrays of "replicated" point responses (i.e., "replicated" glints) appearing at the locations $\xi = \xi_n$ and $\eta = \eta_n$ in the back focal plane of the Fourier transform lens 18. The locations $\xi = \xi_n$ and $\eta = \eta_n$ correspond to the directions of the plane waves that comprise the playback wave, since an angle in the spatial domain corresponds to a location in the frequency domain and vice versa. Furthermore, these arrays of "replicated" glints are symmetric about the off-axis points $\xi=+\xi_0$ and $\xi=-\xi_0$, which are determined by the angle of the "reference" wavefront $U_r(x,y)$ used to record the hologram. Thus, in equation (16), the terms representing the arrays of "replicated" glints (which are the only terms of interest in target-tracking applications) are spatially separated from the on-axis blur, which can be eliminated by spatial filtering.

The energy distribution $t(x,y)$ of the "original" image in the focal plane of the optical system can be expressed as $$t(x,y) = A_r \sum_n \text{somb}\left(\frac{\sqrt{(x-x_n)^2 + (y-y_n)^2}}{d}\right) + B \text{ rect}\left(\frac{x-x_0}{W}, \frac{y-y_o}{L}\right), \quad (17)$$

where the somb function represents glints repeated at random locations $(x_n, y_n)$ with amplitude $A_r$ in the focal plane, and where the rect function represents the image of the target at the location $(x_0, y_0)$ in the focal plane. The factor B represents the amplitude of the energy of the target image; and the factors W and L represent the width and the length, respectively, of the target.

The Fourier transform $T(\xi, \eta)$ of the energy distribution $t(x,y)$ of the "original" image is given by $$T(\xi,\eta) = A_r \frac{4d}{\pi} \sum_n e^{-i2\pi x_n \xi} e^{-i2\pi y_n \eta} \text{cyl}(d\sqrt{\xi^2 + \eta^2}) + BWL\ e^{-i2\pi x_0 \xi} e^{-i2\pi y_0 \eta} \text{sinc}(W\xi, L\eta), \quad (18)$$

where the frequency coordinates $\xi$ and $\eta$ are related to the spatial coordinates $x_t$ and $y_t$ of the transform plane as follows:

$$\xi = \frac{x_t}{\lambda f} \quad (19)$$

and $$\eta = \frac{y_t}{\lambda f},$$

where $\lambda$ is the wavelength of the light forming the image, and f is the focal length of the transform lens 11. The function sinc represents the Fourier transform of a rectangular function, as explained in the aforementioned text *Linear Systems, Fourier Transforms and Optics* by J. D. Gaskill.

The first term in equation (18) represents the sum of the plane waves with direction cosines given by $$\frac{x_n x}{\lambda f} + \frac{y_n y}{\lambda f},$$

which correspond to the locations of the glints on the focal plane. By allowing the plane waves as represented by the first term in equation (18) to impinge upon the Fourier transform hologram 13, the playback wave forms the glints in the "replicated" image plane 19 in the same relative positions at which the glints appear in the "original" image plane 15. The Fourier transform hologram 13 effectively reproduces a slightly aberrated version of the actual glints in the same relative positions. As the actual glints move in the "original" image plane 15, the "replicated" glints correspondingly move in the "replicated" image plane 19.

The Fourier transform hologram 13 produces a replicated version of the target image as well as a replicated version of the glints. As illustrated graphically in FIG. 2, the energy distribution of the Fourier-transformed target image in the pupil plane forms an intricate pattern comprising a relatively large central lobe and several much smaller symmetrically disposed side lobes. The "replicated" Fourier-transformed target image produced on the grating 19 has an energy distribution that differs from the energy distribution of the Fourier-transformed target image shown in FIG. 2 due to the additional aberrations introduced to provide a means for distinguishing "replicated" signals from "original" signals. In particular, the "replicated" Fourier-transformed target image has a lower central lobe, larger side lobes, and different null points than the Fourier-transformed target image, indicating that there is less power in the central lobe and more power in the side lobes for the "replicated" Fourier-transformed target image than for the "original" Fourier-transformed target image itself. Consequently, when the waveforms $T_1(\xi,\eta)$ and $T_2(\xi,\eta)$ are superimposed by the beamsplitter 22 to produce the difference signal $T_2(\xi,\eta) - T_1(\xi,\eta)$, there is more residual energy (i.e., more energy remaining after the subtraction process) in the target image than in the glints.

The "original" target image is a rectangular function. The "replicated" target image has the same basic rectangular shape and size as the "original" target image; but the edges and corners of the "replicated" target image are slightly rounded due to the additional aberrations in the Fourier transform hologram. Therefore, the "final" image of the target formed on the focal plane 25, i.e., the difference signal $T_2(\xi,\eta) - T_1(\xi,\eta)$, maintains generally the same shape and size as the "original" target image. Just some of the energy in the "original" target image is removed by the subtraction process.

In summary, glints in the focal plane of an optical imaging system can be suppressed in accordance with the present invention by:

a) Fourier-transforming an image of the imaging system's object field (including glints), and dividing the resulting energy distribution into a first channel and a second channel;

b) focussing the energy in the first channel onto a first diffraction grating so as to impose a periodic carrier on the image, thereby producing a first image signal;

c) directing the energy in the second channel so as to illuminate a Fourier-transform hologram of the complex point response of the imaging system to which additional aberrations (preferably toroidal aberrations) have been added;

d) focussing the energy distribution from the hologram onto a second diffraction grating that is 180° out-of-phase with the first diffraction grating, and blocking higher diffracted orders, thereby producing a second image signal;

e) superimposing the first and second image signals (which are 180° out-of-phase with each other) by means of a beamsplitter to produce a difference signal in a pupil plane;

f) stopping down the final pupil of the imaging system to prevent transmission of residual energy remaining in the difference signal that is attributable to the glints; and g) focussing the final pupil of the imaging system to a final image in which the glints have been suppressed.

A technique for determining glint positions in the focal plane of an optical system, and for subtracting such glints so as to provide an unambiguous image of an object that is being imaged by the system, has been described above in terms of a particular embodiment. However, other embodiments suitable for particular applications would be apparent to practitioners skilled in the art upon perusal of the foregoing specification and accompanying drawing. Therefore, the embodiment described in the foregoing specification and accompanying drawing is to be understood as merely illustrative of the invention, which is defined more generally by the following claims and their equivalents.

I claim:

1. A method for suppressing glints in a focal plane of an optical imaging system, said method comprising the steps of:

a) performing a Fourier transformation of an energy distribution function that represents optical energy contained in an original image with glints that is formed in a focal plane of said imaging system, said Fourier transformation of said energy distribution function being expressed in terms of frequency coordinates;

b) dividing said Fourier transformation of said energy distribution function into first and second energy components for propagation in corresponding first and second channels;

c) introducing an aberration into said second energy component propagated in said second channel to form a replicated version of said original image with glints, said replicated version of said original image with glints being expressed in terms of frequency coordinates;

d) performing a Fourier transformation of said first energy component propagated in said first channel to form a Fourier-transformed signal that represents said original image with glints, said Fourier-transformed signal representing said original image with glints being expressed in terms of spatial coordinates;

e) combining said Fourier-transformed signal representing said original image with glints with a periodic spatial carrier to form a modulated Fourier-transformed signal representing said original image with glints expressed in terms of spatial coordinates;

f) performing a Fourier transformation of said replicated version of said original image with glints to form a Fourier-transformed signal that represents said replicated version of said original image with glints expressed in terms of spatial coordinates;

g) combining said Fourier-transformed signal representing said replicated version of said original image with glints with a periodic spatial carrier that is 180° out-of-phase with said Fourier-transformed signal representing said original image with glints to form a modulated Fourier-transformed signal representing said replicated version of said original image with glints expressed in terms of spatial coordinates;

h) performing a Fourier transformation of said modulated Fourier-transformed signal representing said original image with glints to form a first Fourier-transformed modulated signal expressed in terms of frequency coordinates;

i) performing a Fourier transformation of said modulated Fourier-transformed signal representing said replicated version of said original image with glints to form a second Fourier-transformed modulated signal expressed in terms of frequency coordinates;

j) combining said first and second Fourier-transformed modulated signals to form a Fourier-transformed difference signal, said difference signal being expressed in terms of frequency coordinates;

k) stopping down said difference signal in a pupil plane of said imaging system to eliminate residual energy attributable to said glints; and l) performing a Fourier transformation of said stopped-down difference signal to form a final image expressed in terms of spatial coordinates in which glints have been substantially suppressed.

2. The method of claim 1 wherein the step of performing said Fourier transformation of said energy distribution function representing optical energy contained in said original image with glints is accomplished by means of a Fourier-transform lens that images said energy distribution function at infinity.

3. The method of claim 2 wherein the step of dividing said Fourier transformation of said energy distribution function into said first and second energy components is accomplished by means of a beamsplitter positioned in the image space of said Fourier-transform lens.

4. The method of claim 2 wherein the step of introducing said aberration into said second energy component of said Fourier transformation of said energy distribution function propagated in said second channel is accomplished by transmitting said second energy component through a Fourier-transform hologram.

5. The method of claim 2 wherein said aberration consists of a plurality of toroidal aberrations.

6. The method of claim 2 wherein the step of performing said Fourier transformation of said first energy component propagated in said first channel, and the step of performing said Fourier transformation of said replicated version of said original image with glints propagated in said second channel, are accomplished by means of corresponding Fourier-transform lenses positioned in said first and second channels.

7. The method of claim 6 wherein the step of combining said Fourier-transformed signal representing said original image with glints with said periodic spatial carrier is accomplished by means of a grating positioned in the back focal plane of the Fourier-transform lens in said first channel.

8. The method of claim 6 wherein the step of combining said Fourier-transformed signal representing said replicated version of said original image with glints with said 180° out-of-phase spatial carrier is accomplished by means of a grating positioned in the back focal plane of the Fourier-transform lens in said second channel, said grating positioned in the back focal plane of the Fourier-transform lens in said second channel being 180° out-of-phase with the grating positioned in the back focal plane of the Fourier-transform lens in said first channel.

9. The method of claim 2 wherein the step of performing said Fourier transformation of said modulated Fourier-transformed signal representing said original image with glints, and the step of performing said Fourier transformation of said modulated Fourier-transformed signal representing said replicated version of said original image with glints, are accomplished by means of corresponding Fourier-transform lenses positioned in said first and second channels to image the energy distribution in each of said first and second channels at infinity.

10. The method of claim 2 wherein the step of combining said first and second Fourier-transformed modulated signals to form said Fourier-transformed difference signal is accomplished by means of a beamsplitter positioned to transmit a portion of the energy in one of said first and second Fourier-transformed modulated signals to said pupil plane, and to reflect a portion of the energy in the other of said first and second Fourier-transformed modulated signals to said pupil plane.

11. The method of claim 10 wherein said difference signal represents a difference in energy between said original image with glints and said replicated version of said original image with glints at said pupil plane.

12. The method of claim 11 wherein the step of stopping down said difference signal is accomplished by positioning a pupil at said pupil plane, said pupil being smaller in diameter than said difference signal.

13. The method of claim 2 wherein the step of performing said Fourier transformation of said stopped-down difference signal is accomplished by means of a Fourier-transform lens that is positioned to cause said stopped-down difference signal in said pupil plane to be focussed in the back focal plane of said Fourier-transform lens.

* * * * *